Jan. 15, 1924.

A. H. KEHRHAHN 1,481,135

STAKING MACHINE

Filed Aug. 30, 1923

INVENTOR
Alexander H. Kehrhahn
By his ATTORNEY

Patented Jan. 15, 1924.

1,481,135

UNITED STATES PATENT OFFICE.

ALEXANDER H. KEHRHAHN, OF FRANKFORT-ON-THE-MAIN, GERMANY, ASSIGNOR TO THE TURNER TANNING MACHINERY COMPANY, OF PEABODY, MASSACHUSETTS, A CORPORATION OF MAINE.

STAKING MACHINE.

Application filed August 30, 1923. Serial No. 660,232.

*To all whom it may concern:*

Be it known that I, ALEXANDER H. KEHRHAHN, a citizen of Germany, residing in Furstenberger str. 177, Frankfort-on-the-Main, Germany, have invented certain Improvements in Staking Machines, of which the following description, in connection with the accompanying drawings, is a specification, like reference characters on the drawings indicating like parts in the several figures.

This invention relates to machines for treating leather, and more particularly to machines for fleshing, stretching or staking light skins such as sheep skins.

A great deal of staking of light skins is still performed by skilled workmen making use of stationary staking tools supported upon standards or posts fixed to the floor. This work is tedious and laborious and the output relatively limited. It is not uncommon in foreign countries to make use of a power driven wheel or disc carrying staking blades or cutters extending radially from the periphery of the wheel. In practice two machines are used, a wheel of approximately four inches in width for stretching the body portion of the skin and a similar wheel, about ten inches in width and with the blades or cutters much closer together than in the smaller wheel, for staking the skin and particularly the edge portions of the skin.

It is an object of the invention to reduce materially the amount of hand labor in treating skins and to effect a corresponding increase in the output per unit of time. It is a further object to provide a single machine which may be used advantageously, on certain kinds of work, in place of the two machines to which reference has been made. On other kinds of work, the machine of this invention will be used as a substitute for the first of the two machines discussed above since it will work out the skin much better and much faster and effect both stretching and staking of the skin. Hence the time required for subsequent treatment on a wide machine with closely spaced blades will be greatly reduced, the latter machine being used, if at all, because of somewhat greater ease in securing uniformity in the appearance of the skin and as a general finishing of the staking operation.

The illustrative embodiment of the present invention comprises a wheel or disc provided with blades with relatively sharp edges which operate upon a skin held transversely of the wheel or disc. These blades or cutters are spaced rather widely apart from each other, and serve most effectively to open up and to stretch and beat the skin. In between the blades of the first set are other blades which have only lateral working edges and these blades may be set relatively close together. Preferably and as shown the lateral edges of the blades of the first set also operate as working edges together with the blades of the second set, so that by interposing one or two blades of the second set between each pair of blades of the first set a sufficient number of lateral working edges is provided without unduly multiplying the total number of blades on the periphery of the wheel. The closely spaced lateral working edges of the blades function as a staking means under the pressure of the operator's hand. Another feature of importance relates to the provision of a guard and hand rest for facilitating the work of the operator in presenting the skin to the lateral edges of the blades.

Other features of construction and novel combinations of parts will be described in the detailed specification and pointed out in the appended claims.

In the drawings,—

Figure 1:
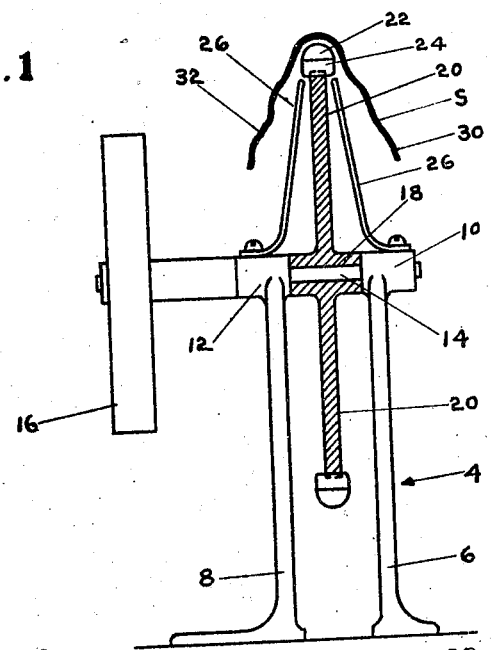
Fig. 1 is a view, in front elevation, and partly in section of one embodiment of the invention.
Figure 3:
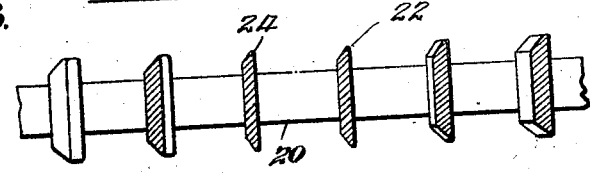
Fig. 3 is a section on line 3—3 of Fig. 2 looking in the direction of the arrows.
Figure 2:
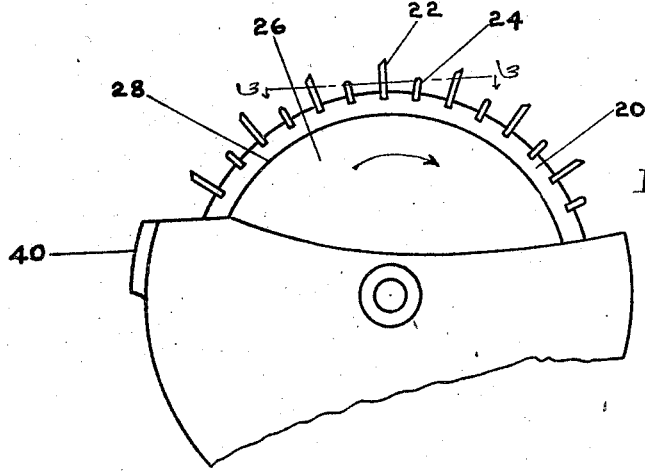
Fig. 2 is a detail view showing a portion of the wheel when viewed from either side of the machine.

In the illustrated machine the frame 4 comprises spaced supporting members 6 and 8 carrying at their upper ends bearings 10 and 12 for a shaft 14 upon the free end of which is mounted the driving pulley 16. Between the bearings 10 and 12 is located a hub 18 of the staking wheel 20, which is adapted to be rotated at a high rate of speed through power applied to the pulley 16, the hub of the wheel being secured to the shaft 14 in any well known manner. Fixed in the periphery of the wheel 20 at regularly spaced distances are the large blades 22 arranged to extend radially from the periphery of the wheel. Between each pair of large blades 22 there is interposed one or more low blades 24 which are of the same width as the high blades 22, i. e., of the same dimension in a direction transverse of the wheel 20. It will be noted that the blades 22 have their curved working edges, which point in a direction radially of the wheel, sharpened so that during the stretching operations on the body portion of the skins there will be a certain amount of scraping and buffing actions also. The upper edges of the blades 24 are not sharpened because these edges do not operate upon the skins. However, both sets of knives or blades 22, 24 are employed in staking the body portion of the skin and particularly the edge portions and tabs of the skins which are held against the side edges of the cutters by the hand of the operator. Hence, the side edges of the blades or cutters 22, 24, which point in a direction parallel to the axis of the disk, may be relatively sharp edged, as in the ordinary staking tool employed by operators in hand and knee work. Secured fixedly to the upper surface of each bearing 10 and 12 is a guard plate 26 which is shaped like the segment of a circle and has its upper curved edge 28 extending in a curved line just below the lower edges of the blades or knives 22, 24 which project laterally from each side face of the wheel. These guard plates 26 are sufficiently rigid to furnish a support for the hand of the operator while the hand is employed in pressing the work against the side or lateral edges of the knives or blades 22, 24.

In operating with the machine, the skins which are to be stretched and staked are first presented to the blades 22, that is, to the high blades which will operate during the continuously rapid movement of the blades to stretch the leather and to beat it, thus, at the same time, softening the leather and rendering it more flexible. During this operation the skin S is gripped at points along opposite edge portions thereof as at 30, 32 to hold the skin more or less firmly against the periphery of the wheel 20 so that the body portion of the skin is opened up and stretched by the revolving blades 22. Since these blades 22 are provided with sharpened edges pointing in a direction radially of the wheel the effect on the skins will be to scrape them and, to a considerable extent buff the surfaces presented to the blades. By shifting the skin S laterally from the position shown in Fig. 1, first in one direction and then in another, the entire body portion of the skin may be readily operated upon. To complete the staking of the skin particularly upon the edge portions of the skin and upon tabs or other projecting portions, all portions of the skin in succession are pressed against the lateral working edges of all of the blades 22, 24, the edges and tabs requiring more attention than the body portion since the latter was more thoroughly worked by the first set of blades. In this operation the backs of the fingers of the closed hand rest upon the guard 26, and the fleshy part of the palm of the hand presses the skin against the said working edges of the blades. Such a manner of operation is possible because of the close spacing of the lateral working edges which prevents the hand from entering into the path of the blades where it would receive a severe beating. With the working edges arranged closely adjacent each other the effect is that of a rubbing and scraping action which softens the skins. Some operators may prefer to hold the edge portion of the skin against the lateral working edges of the blades with the open hand. In either case the skin including the marginal portions thereof are readily softened and buffed in a manner that will be well understood to those skilled in the art.

Having thus described my invention, what I claim as new and desire to secure by Letters Patent of the United States is:

1. In a machine of the character described, a wheel having blades or cutters mounted on its periphery, all of the blades having sharpened edges pointing in a direction transversely of the wheel, and certain of the blades having also sharpened edges pointing in a direction radially of the wheel, the arrangement being such that the last-mentioned edges are spaced widely apart in comparison with the first-mentioned edges.

2. In a machine of the character described, a wheel, blades or cutters mounted on the wheel and having cutting edges pointing in a direction radially of the wheel, and a second set of blades shorter than the blades in the first set and having working edges pointing in a direction parallel to the axis of the wheel.

3. In a machine of the character described, a wheel, and a plurality of blades mounted on the periphery of the wheel, certain of the blades being longer than the others and having cutting edges pointing in a direction radially of the wheel and all of the blades having working edges pointing in a direction parallel to the axis of the wheel.

4. In a machine of the character described, a rotatable wheel, and a plurality of blades mounted on the periphery of the wheel and having working edges pointing in a direction parallel to the axis of the wheel, said blades projecting laterally from each side face of the wheel, and a stationary guard member having an upper curved edge just below the lower edges of the blades and adapted to support the hand of the operator employed in pressing the work against said working edges of the blades.

In testimony whereof I have signed my name to this specification.

ALEXANDER H. KEHRHAHN.

Witnesses:
 CARL CONDERELING,
 IGNATZ GEIGEY.